United States Patent
Lang

[15] 3,658,644
[45] Apr. 25, 1972

[54] FAST BREEDER REACTOR
[72] Inventor: Linton W. Lang, Richland, Wash.
[73] Assignee: The United States of America as represented by the United States Atomic Energy Commission
[22] Filed: Feb. 6, 1970
[21] Appl. No.: 9,298

[52] U.S. Cl. ................................ 176/18, 176/40, 176/52
[51] Int. Cl. ................................ G21c 1/02, G21c 15/00
[58] Field of Search ........................... 176/17, 18, 40, 52

[56] References Cited

UNITED STATES PATENTS

| | | | |
|---|---|---|---|
| 2,922,982 | 7/1961 | Avery | 176/17 |
| 3,140,237 | 7/1964 | Peterson et al. | 176/18 |
| 3,267,001 | 8/1966 | Greebler | 176/18 X |
| 3,297,539 | 1/1967 | Beckurts et al. | 176/18 X |
| 3,310,473 | 3/1967 | Winsche | 176/30 |
| 3,341,420 | 9/1967 | Sevy | 176/18 |

FOREIGN PATENTS OR APPLICATIONS

| | | | |
|---|---|---|---|
| 799,725 | 8/1958 | Great Britain | 176/29 |
| 822,356 | 10/1959 | Great Britain | 176/18 |
| 1,063,310 | 3/1967 | Great Britain | 176/40 |

OTHER PUBLICATIONS

Transactions of ANS, Vol. 8, No. 1, June 1965, p. 213.

Primary Examiner—Carl D. Quarforth
Assistant Examiner—Harvey B. Behrend
Attorney—Roland A. Anderson

[57] ABSTRACT

A fast breeder reactor consists of a core, an inner blanket consisting of a single ring of blanket elements surrounding the core, an outer blanket surrounding the inner blanket and a partition containing a moderating material and, preferably, a material which absorbs thermal neutrons separating the inner blanket from the outer blanket. Lithium can be used as both the moderating and absorbing material, tritium being formed therein as a useful byproduct.

1 Claims, 1 Drawing Figure

Patented April 25, 1972
3,658,644
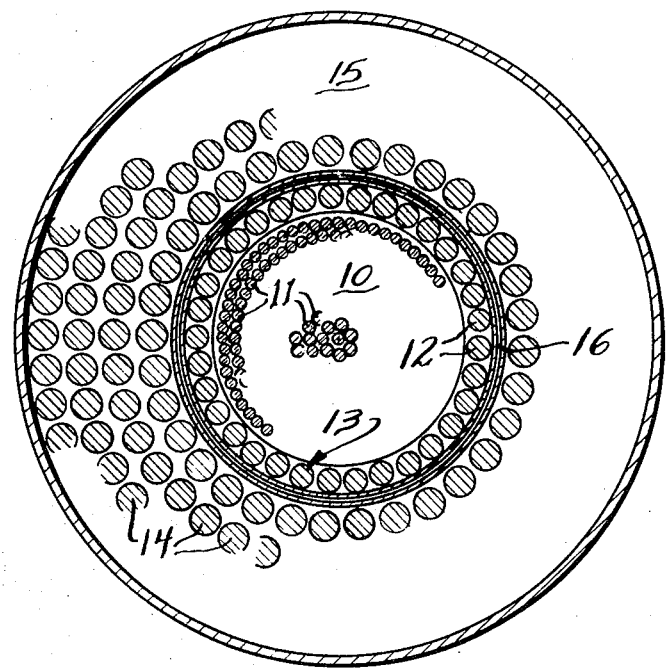
Inventor
Linton W. Lang
Attorney

FAST BREEDER REACTOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a nuclear reactor. In more detail the invention relates to a fast breeder reactor having valuable production features. In still more detail the invention relates to a fast breeder reactor in which the production and power functions of the reactor are separated and in which clean U-233 is produced. The invention further relates to a reactor which produces tritium as a byproduct.

A fast reactor normally consists of a central core and a surrounding blanket. The core uses closely packed fuel elements containing a high percentage of fissionable isotopes and generates most of the heat of the reactor from fast fissions in the fuel contained in the core. The blanket absorbs the excess neutrons produced by the core. When fertile material is used in the blanket and more fissile fuel is produced than consumed, the reactor is considered a breeder reactor. Some of the heat produced in the reactor is produced in the blanket by fast fissioning of the blanket material; most of this heat is produced in the row of blanket assemblies immediately adjacent the core because these assemblies see the greatest percentage of fission neutrons. In fact, 90 percent of the heat produced in the reactor is produced in the core and inner row of blanket assemblies while most of the bred fuel is produced in the remaining blanket assemblies.

BRIEF DESCRIPTION OF THE DRAWING

The FIGURE is a sketch showing a horizontal cross section of a reactor constructed according to the present invention.

SPECIFIC EMBODIMENT OF THE INVENTION

As shown in the drawing the reactor comprises a core 10 consisting of a plurality of small elongated, cylindrical, fuel pins 11 surrounded by a single row of blanket assemblies 12 constituting an inner blanket 13 which in turn is surrounded by a plurality of blanket assemblies 14 constituting an outer blanket 15. Separating inner blanket 13 from outer blanket 15 is a partition 16 which may be varied in composition and which will be further described in detail since it constitutes the major feature of the present invention. It will be understood of course that other conventional features such as control rods and cooling means necessary to operation of the reactor are also employed although not included in the drawing.

If the reactor as thus described be envisioned as containing two parts —a heat production unit and a fissionable material production unit—useful results can be obtained by separating these functions by a moderating partition. Thus partition 16 is provided between inner blanket 13 and outer blanket 15. Partition 16 may contain a moderator, a material having a high capture cross section for neutrons or both. The moderator and poison are inserted into the partition in easily removable form to obtain flexibility in operation of the reactor. Primary advantages of the present invention are attained when a moderator is employed in the partition. The moderating material used in the partition will not completely moderate the flux but will drastically reduce the number of fast neutrons passing therethrough and therefore reduce the number of fast fissions occurring in the outer blanket. Use of a moderating material as described to separate the heat and production functions of a reactor makes it possible to use a high integrity liquid metal cooling system to remove the heat from the core and inner blanket while employing gas cooling to cool the outer blanket. Assemblies in the outer blanket could then be discharged separately from those in the core and inner blanket and would not require sodium cleaning before processing.

By employing thorium as blanket material, clean U-233 can be formed in a reactor constructed according to the present invention. Clean U-233 contains less than 10 ppm contaminating U-232 isotopes. The U-232 because of its radioactive decay chain precludes contact handling of separated uranium isotopes. The contaminating U-232 is built up by $n, 2n$ thorium events. Use of a moderating partition or barrier eliminates most of the fission neutrons and neutrons of sufficient energy to produce $n, 2n$ reactions with the thorium. Production of other isotopes strongly dependent on epi-thermal resonances would also be facilitated by moderating the core spectrum. Examples of such target isotopes include U-238 to form Pu-239 while simple moderators which may be used include lithium-7 and zirconium hydride.

Elimination of the moderator from the partition would, of course, change the flux in the blanket and might at times be desirable. Use of a poison such as boron or natural uranium along with the moderator may also have desirable results. The absorber prevents back scattering of thermal neutrons into the core—which would degrade the energy level in the core—by capturing the thermal neutrons on the way through the partition. Lithium-6 is a particularly desirable absorbing material since tritium formed in lithium-6 by neutron capture is a potentially useful product. A preferred moderating absorber material is natural lithium which acts as a one-way window performing both the function of moderator and absorber for thermal neutrons.

It is to be understood that the invention is not to be limited by the details given herein but that it may be modified within the scope of the appended claims.

The embodiments of the invention in which an exclusive property or privilege is claimed are defined as follows:

1. A fast breeder reactor consisting only of the following arranged sequentially in a vessel, a single core consisting of a plurality of small elongated, cylindrical, fissile fuel pins arranged into a single assembly blanket elements surrounding the core, an outer blanket consisting of a plurality of rows of blanket elements surrounding the inner blanket and a partition containing natural lithium disposed between the inner blanket and the outer blanket, said partition separating the heat and production functions of the reactor by reducing the number of fast fissions in the outer blanket and preventing back scattering of thermal neutrons into the core, said outer blanket elements filling all the remaining space between the partition and the vessel wall, a liquid metal coolant system including said core and inner blanket for removing heat from said core and inner blanket, a separate gas cooling system including said outer blanket for removing heat therefrom, said blanket elements being formed of thorium whereby U-233 containing less than 10 ppm contaminating U-232 isotopes is produced in the blanket.

\* \* \* \* \*

UNITED STATES PATENT OFFICE
CERTIFICATE OF CORRECTION

Patent No. 3,658,644          Dated April 25, 1972

Inventor(s) Linton W. Lang

It is certified that error appears in the above-identified patent and that said Letters Patent are hereby corrected as shown below:

Col. 2, line 22, after "include" insert --U-236 to form Np-237 and--.

Col. 2, line 46, after "assembly" insert --, an inner blanket consisting of a single row of--.

Signed and sealed this 19th day of September 1972.

(SEAL)
Attest:

EDWARD M. FLETCHER, JR.          ROBERT GOTTSCHALK
Attesting Officer                Commissioner of Patents